United States Patent
Maiya et al.

(10) Patent No.: US 7,976,721 B2
(45) Date of Patent: Jul. 12, 2011

(54) REFRIGERANT COMPOSITION

(75) Inventors: Seijyuro Maiya, Tokyo (JP); Osamu Nakagome, Tokyo (JP); Hideyuki Suzuki, Kanagawa (JP); Yasuhisa Kotani, Tokyo (JP); Toshifumi Hatanaka, Nara (JP); Toshihiro Wada, Chiba (JP)

(73) Assignees: Japan Petroleum Exploration Co., Ltd., Tokyo (JP); Showa Tansan Co., Ltd., Tokyo (JP); Toyota Tsusho Corporation, Aichi (JP)

( * ) Notice: Subject to any disclaimer, the term of this patent is extended or adjusted under 35 U.S.C. 154(b) by 0 days.

(21) Appl. No.: 12/876,799

(22) Filed: Sep. 7, 2010

(65) Prior Publication Data

US 2011/0017940 A1 Jan. 27, 2011

Related U.S. Application Data

(62) Division of application No. 12/067,429, filed as application No. PCT/JP2006/316088 on Aug. 16, 2006, now abandoned.

(30) Foreign Application Priority Data

Sep. 27, 2005 (JP) .................................. 2005-279209

(51) Int. Cl.
*C09K 5/04* (2006.01)
(52) U.S. Cl. ....................................................... 252/67
(58) Field of Classification Search ..................... 252/67
See application file for complete search history.

(56) References Cited

U.S. PATENT DOCUMENTS

| | | | |
|---|---|---|---|
| 6,013,609 | A | 1/2000 | Katafuchi |
| 6,231,782 | B1 | 5/2001 | Shimomura et al. |
| 2003/0146407 | A1 | 8/2003 | Shimomura et al. |
| 2005/0211949 | A1 | 9/2005 | Bivens et al. |
| 2007/0138433 | A1 | 6/2007 | Drigotas et al. |
| 2009/0045375 | A1 | 2/2009 | Maiya et al. |

FOREIGN PATENT DOCUMENTS

| | | |
|---|---|---|
| JP | 2000-96071 | 4/2000 |
| JP | 2000-104085 | 4/2000 |
| JP | 2001-019944 | 1/2001 |
| JP | 2002-235072 | 8/2002 |
| JP | 2003-336916 | 11/2003 |
| JP | 2006-022305 | 1/2006 |
| WO | 2005118739 A1 | 12/2005 |

OTHER PUBLICATIONS

Chinese Office Action for Corresponding Chinese Application No. 200680035307.9 dated Aug. 14, 2009.

(Continued)

*Primary Examiner* — John R Hardee
(74) *Attorney, Agent, or Firm* — Thompson Coburn LLP

(57) ABSTRACT

To provide a safe, nontoxic, and high-performance mixed refrigerant for hot water supply/heating system which is prepared by mixing dimethyl ether with carbon dioxide and which does not deplete the ozone layer, has a low global warming potential, and permits low-pressure operation.

A refrigerant composition for hot water supply/heating comprising 1 to 10% by mole of dimethyl ether and 99 to 90% by mole of carbon dioxide on the basis of the total number of moles of dimethyl ether and carbon dioxide.

2 Claims, 2 Drawing Sheets

Schematic diagram of hot water supply system

EQ1: Compressor (COMPRESSOR, polytropic efficiency=0.6)
EQ2: Condenser (CONDENSER)
EQ3: Expander (EXPANDER)
EQ4: Vaporizer (VAPORIZER)
T1~T4: Temperature
P1~P4: Pressure

OTHER PUBLICATIONS

Hongkui Liu et al.; "Preparation of Refrigerants"; Chemical Abstract; 2003; No. 26 1 38:403608g; vol. 138.

International Search Report from corresponding PCT/JP2006/316088.

Tsang et al., "Vapor-Liquid Equilibrium in the System Carbon Dioxide/Dimethyl Ether", Journal of Chemical and Engineering Data, 1981, pp. 155-159, vol. 26, No. 2.

Extended European Search Report for EP Application 06796448.6 dated Nov. 16, 2010.

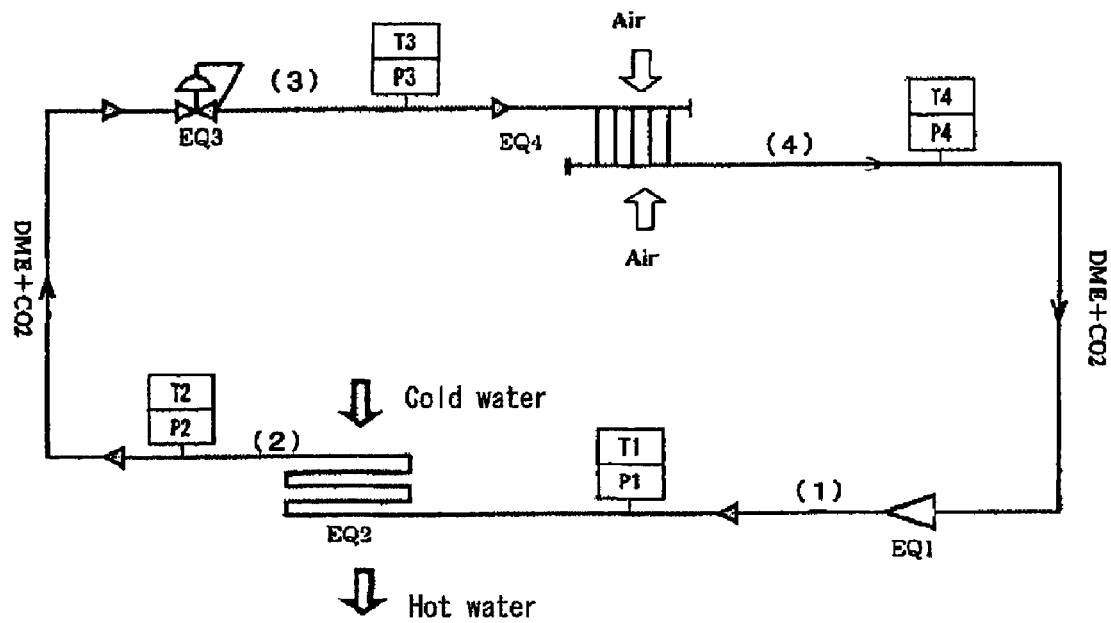
Figure 1 Schematic diagram of hot water supply system
EQ1: Compressor (COMPRESSOR, polytropic efficiency=0.6)
EQ2: Condenser (CONDENSER)
EQ3: Expander (EXPANDER)
EQ4: Vaporizer (VAPORIZER)
T1~T4: Temperature
P1~P4: Pressure Figure 2 DME CO₂ B programming flow-chart
Calculation of DME + CO₂ refrigerant cycle
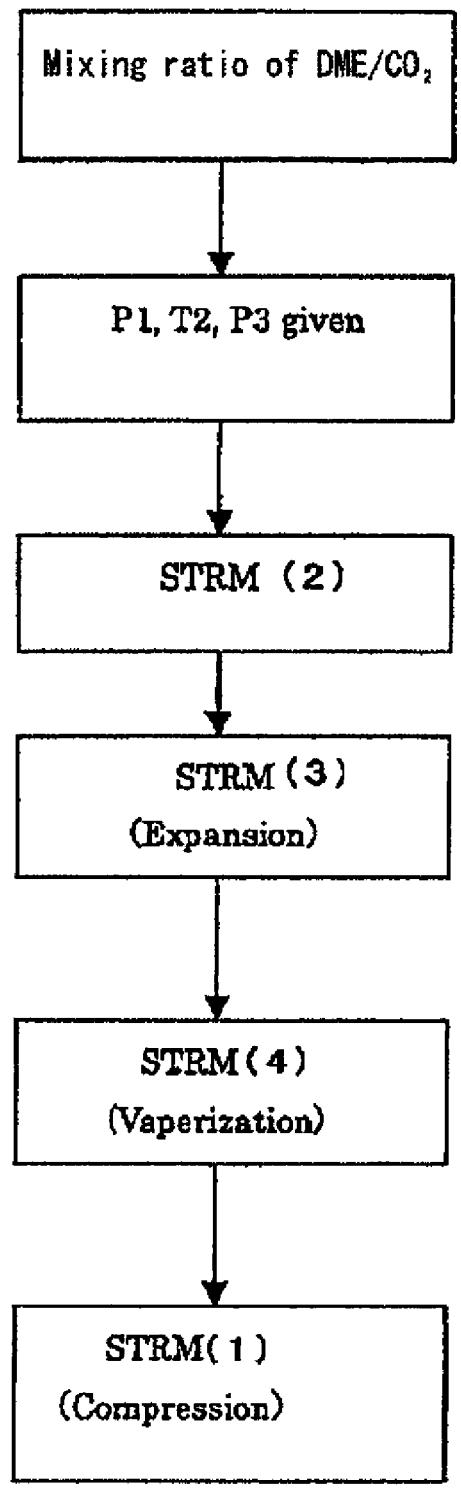

REFRIGERANT COMPOSITION

CROSS-REFERENCES TO RELATED APPLICATIONS

The present application is a divisional application of U.S. patent application Ser. No. 12/067,429, filed Mar. 19, 2008, which is incorporated herein by reference in its entirety, and through which the present application claims the benefit of PCT/JP2006/316088, filed Aug. 16, 2006, and Japanese Application No. 2005-279209, filed Sep. 27, 2005, both of which are entitled "Refrigerant Composition" and are incorporated herein by reference in their entireties.

TECHNICAL FIELD

The present invention relates to a refrigerant composition containing dimethyl ether and carbon dioxide used for a heat pump hot water supply.

BACKGROUND ART

Carbon dioxide has zero ozone-depleting potential, global warming potential of exactly 1 and extremely small environmental load as well as absence of toxicity, and flammability, safety, low price, and a low critical temperature of 31.1° C. Since in an air conditioning system and a hot-water system, heating can be performed even in a small temperature difference between the refrigerant and the refrigerated fluid due to readily attaining the supercritical point in a high pressure side of the cycling. As a result, in the heating process with large warm-up range as like hot-water supply, carbon dioxide is currently widely used as the refrigerant for a heat pump hot water supply under the naming of "ecocute", since high coefficient of performance can be obtained; high heating ability in input volume per unit of compressor can be expected; and high thermal conductivity can be obtained.

However, since a working pressure of a carbon dioxide refrigerant is rather high as about 10 MPa compared with other refrigerants and as a result, each and every part of the system device should be assembled by super high pressure specifications, development of an elemental technology of the cycle system with appropriate prices remains a big issue.

DISCLOSURE OF THE INVENTION

An object of the present invention is to provide a safe, non-toxic refrigerant composition for hot water supply/heating as an alternative to carbon dioxide supercritical refrigerant. Such refrigerant composition has a small risk for depleting the ozone layer, has small damaging effect on the global warming, exhibits incombustibility or fire retardancy, and operates at lower pressures while exhibiting excellent performance.

Carbon dioxide has a critical temperature of 31.1° C. and a boiling point of −56.6° C., whereas dimethyl ether has a critical temperature of 126.85° C. and a boiling point of −25° C., indicating a great difference between the two in their physical property. For that reason, carbon dioxide is utilized as a refrigerant in a very high pressure region such as low pressure at about 3 MPa to high pressure at about 10 MPa, whereas dimethyl ether is utilized as a refrigerant in a comparatively low pressure region such as low pressure at about 0.7 MPa to high pressure at about 2 MPa, and is known to exert best performance as the refrigerant under such pressure condition. Consequently, although carbon dioxide and dimethyl ether have been used alone as the refrigerant, an idea of trying to utilize as the refrigerant by mixing carbon dioxide and dimethyl ether having completely different properties has not been made or examined.

Contrary to that, the present inventors have tried to perform an assessment test and a macroscopic test on solubility of carbon dioxide in dimethyl ether and have confirmed that although the amount of mass transfer (dissolved amount) to gas-liquid equilibrium is changed depending on the conditions of temperature and pressure, carbon dioxide was dissolved and diffused well in dimethyl ether. The present inventors have considered the possibilities of obtaining physical properties showing extremely high thermal efficiency by mixing carbon dioxide which has physically high efficiency of heat transfer (0.02 W/mK) and dimethyl ether which has higher specific heat (138 J/molK), continued the development and simulation, and found that the mixture of dimethyl ether and carbon dioxide was a refrigerant for heating/hot water supply which could operate at low pressure while exhibiting excellent coefficient of performance, and completed the present invention.

|  | Carbon dioxide | Dimethyl ether |
|---|---|---|
| Specific heat (J/molK) | 30-40 | 138 |
| Thermal conductivity (W/mK) | 0.02 | 0.013 |

The present invention relates to a refrigerant composition for hot water supply/heating comprising 1 to 10% by mole of dimethyl ether and 99 to 90% by mole of carbon dioxide on the basis of the total number of moles of dimethyl ether and carbon dioxide.

As explained hereinabove, a mixture of dimethyl ether and carbon dioxide of the present invention is a refrigerant which has superior heating and hot water supplying ability, does not deplete the ozone layer, has almost zero global warming potential (GWP), is safe and non-toxic, and operates at low pressure while exhibiting excellent performance.

BRIEF DESCRIPTION OF THE DRAWINGS

FIG. 1 is a Pattern diagram of hot water supply system; and
FIG. 2 is a DME $CO_2B$ programming flow-chart.

BEST MODE FOR CARRYING OUT THE INVENTION

Preferable embodiments of the present invention will be explained in detail hereinbelow.

Dimethyl ether used in the refrigerant composition of the present invention can be obtained by synthesizing dimethyl ether directly from hydrogen and carbon monoxide or indirectly from hydrogen and carbon monoxide through methanol synthesis by utilizing raw materials of a coal gasification gas, a BOG (boil of gas) of LNG tank, natural gases, by-product gases from a steel plant, oil residues, waste products and biogas.

Carbon dioxide used in the refrigerant composition of the present invention can be obtained by compression, liquefaction and purification of ammonium synthesis gas and by-product gas as the raw material generated from a hydrogen manufacturing plant for desulfurization of fuel oil.

A mixing ratio of dimethyl ether and carbon dioxide in the refrigerant composition of the present invention is appropriately determined depending on types of a hot water supply/heater in which the refrigerant is used. The refrigerant composition of the present invention contains, on the basis of the total number of moles of dimethyl ether and carbon dioxide, preferably dimethyl ether at 1 to 10% by moles and carbon dioxide at 99 to 90% by moles, more preferably dimethyl ether at 3 to 8% by moles and carbon dioxide at 97 to 92% by moles. If a ratio of dimethyl ether is less than 1% by mole, a coefficient of the performance hereinafter described decreases, and it is not preferred as an effect of adding dimethyl ether is not exhibited. On the other hand, if the ratio of dimethyl ether is more than 10% by moles, since the refrigerant composition is out of an inflammable range, it is unfavorable on safety reason when particularly high safety standard is required (for example, a direct leakage system in which a refrigerant filling unit exists in a room or use in a place such as in a room where the space is sealed).

The mixing ratio of the refrigerant composition of the present invention can be obtained, for example, by filling a predetermined amount of liquid dimethyl ether in a vessel from a tank filled with liquid dimethyl ether, subsequently filling a predetermined amount of liquid carbon dioxide thereto from a tank filled with liquid carbon dioxide. Further, after filling the predetermined amount of liquid dimethyl ether in the vessel, the refrigerant composition of the present invention can be prepared by such that carbon dioxide gas is filled into the gas phase part of the vessel and is dissolved and mixed under pressure into dimethyl ether.

In the refrigerant composition of the present invention, for example, water as another additive can be added. Since water can be dissolved about a little over 7% by mole in dimethyl ether under the conditions of 1 atmospheric pressure at 18° C., and has the characteristics of higher vaporization (condensation) latent heat as well as having a small rate of temperature change to the vaporization latent heat due to a high critical point, as a result large latent heat can be obtained even in a high-temperature region. Consequently, it is estimated to obtain further high thermal efficiency by admixing three types of substance, i.e. carbon dioxide having high sensible heat effect, and dimethyl ether and water both having high latent heat effect. A ratio of mixing water in this case is determined not to exceed 7% by mole in consideration of solubility to dimethyl ether.

Method for Evaluation of Refrigerant Characteristics

Hot Water Supply System

A hot water supply system is generally composed of a compressor, a condenser, an extender and a vaporizer as shown in FIG. 1, and hot water for hot water supply is generated by performing heat exchange between a high temperature refrigerant from the compressor and cold water at condenser. A working pressure in the condenser side becomes supercritical ($CO_2$ critical pressure: 7.4 MPa) at a high pressure of 9 MPa or more in the $CO_2$ refrigerant hot water supply cycle, the working pressure of the vaporizer in the low pressure side constitutes transition critical cycle of 3 MPa or more.

Simulation for Hot Water Supply Performance of $CO_2$/DME Refrigerant

In order to evaluate hot water supply performance of a $CO_2$/DME refrigerant, a numerical model of a standard cycle for hot water supply in FIG. 1 is prepared, and using a general-purpose simulation system for a numerical chemical process, the hot water supply performance of the $CO_2$/DME refrigerant can be analyzed and evaluated by the known method (e.g. see Miyara et al., "Effect of heat transfer characteristics of heat exchanger on non-azeotropic mixture refrigerant heat pump cycle," Transactions of the Japanese Association of Refrigeration, 7(1): 65-73, 1990). The general-purpose simulation system for the numerical chemical process stores database of thermodynamic properties of various components, and equilibrium thermodynamic calculation on interaction of chemical components corresponding to a mechanical engineering function of various systems can be performed.

In the numerical simulation, a system circulating the refrigerant composed of a compressor, a circulator, an expander and a vaporizer is expressed numerically, and the hot water supply performance is evaluated as coefficient of performance (COP) by using parameters of output pressure of compressor ($P1$), discharge temperature of condenser ($T2$), temperature of a vaporizer ($T3$) and molar concentration of dimethyl ether/$CO_2$.

Hot water supply COP=total amount of exhaust heat of refrigerant in condenser÷amount of power of compressor The present invention can be highly precisely evaluated by applying, preferably as an estimate equation for thermodynamic physical value of refrigerant, regular solution model with respect to dissolution and SRK (Soave-Redlich-Kwong) equation of state with respect to the equation of state, respectively.

The refrigerant composition of the present invention can be fundamentally used directly in conventional carbon dioxide heat pump water supply known as naming of ecocute. However, considering the physical properties of the refrigerant of the present invention, a mechanical aspect of a condenser, a piston, etc. can be appropriately improved and designed in conformity with the refrigerant composition of the present invention.

EXAMPLES

The present invention will be described with reference to examples hereinbelow in detail, however the present invention is not limited within these examples.

Solubility Test of Dimethyl Ether/Carbon Dioxide

In order to know solubility of a mixture system of dimethyl ether (DME) and carbon dioxide ($CO_2$), and in order to obtain coefficient of performance of the mixed refrigerant in the hot water supply system described hereinbelow, a solubility test of DME/$CO_2$ was performed. The test method is as follows.

(1) 300 g of dimethyl ether was encapsulated and sealed in a 500-mL pressure vessel, and weight of the sealed vessel was measured by using an electric weighing machine.

(2) The pressure vessel was set in the constant-temperature bath and kept at a constant temperature.

(3) Carbon dioxide was injected by using a booster pump until obtaining a constant pressure.

(4) Weight of the filled carbon dioxide was calculated by weighing before and after filling (d=0.1 g).

In the filling, the pressure vessel was shaken up and down for completely mixing DME/$CO_2$, and the test was performed after allowing to stand vertically.

Results obtained are shown in Table 1. As shown in Table 1, values of K-volume of $CO_2$ and DME are within the range of $0.66 < K_{DME} < 0.80$ and $2.59 < K_{CO_2} < 3.42$, under the measuring conditions respectively, and it shows that carbon dioxide dissolves well in DME.

TABLE 1

Solubility test results of DME/CO$_2$

| Case | A | B | C | D |
|---|---|---|---|---|
| Pressure of system | 10.0 | 10.0 | 10.0 | 1.0 |
| Temperature of system (C.°) | 10 | 20 | 30 | 40 |
| ZCO$_2$ (g-mol) | 1.682 | 1.500 | 0.977 | 1.045 |
| ZDME (g-mol) | 6.522 | 6.522 | 6.522 | 6.522 |
| V (g-mol) | 1.177 | 1.378 | 2.090 | 0.661 |
| L (g-mol) | 7.027 | 6.634 | 5.409 | 6.906 |
| YCO$_2$ (mol %) | 43.2 | 42.9 | 26.3 | 39.0 |
| XCO$_2$ (mol %) | 16.7 | 13.7 | 7.9 | 11.4 |
| KCO$_2$ (—) | 2.59 | 3.13 | 3.33 | 3.42 |
| YDME (mol %) | 56.8 | 57.1 | 73.7 | 61.0 |
| XDME (mol %) | 83.7 | 86.3 | 92.1 | 88.6 |
| KDME | 0.68 | 0.66 | 0.80 | 0.69 |

ZCO$_2$ = V × YCO$_2$ + L × CO$_2$
ZCO$_2$ + ZDME = V + L
KCO$_2$ = YCO$_2$/XCO$_2$
KDME = YDME/XDME

Coefficient of performance (COP) of the mixed refrigerant of dimethyl ether and carbon dioxide in the hot water supply system shown in FIG. 1 is obtained. Simulation using the simulation chemical system for the numerical process was performed by following operation procedure.

Simulation Procedure

A quantity of state of stream (1) to (4) (volume, enthalpy, entropy, etc.) in the hot water supply system in FIG. 1 was determined by simulation to obtain coefficient of performance (COP) of the following equation.

COP=$H1/H2$

H1: total amount of exhaust heat of refrigerant in condenser (total amount of heat absorption of refrigerant in vaporizer+amount of power of compressor)

H2: amount of power of compressor from (4) to (1)

Condition setting was as follows.

(1) DME/CO$_2$ Mixed Refrigerant

In order to evaluate hot water supply ability of a DME/CO$_2$ mixed refrigerant, the output pressure of the compressor (discharge pressure), P1, the output temperature of the condenser (discharge temperature), P2, the pressure of the vaporizer, P3 and the mixing ratio of DME/CO$_2$ were used as fluctuating parameter for calculation. Herein, an outlet temperature of the condenser of the refrigerant was set at 15° C.

P1=9.16 MPa to 6.31 MPa

P3=2.90 MPa to 2.55 MPa

Discharge temperature=130° C., 120° C., 100° C.

Mixing ratio of DME/CO$_2$=3/97, 4/96, 5/95, 6/94 (molar ratio)

(2) CO$_2$ Refrigerant Alone

For a carbon dioxide refrigerant alone, the simulation was performed by using the discharge pressure of the compressor (P1), the discharge temperature and the pressure of the vaporizer (P3) as fluctuating parameter. Herein, an outlet temperature of the condenser of the refrigerant was set at 15° C.

P1=10 MPa to 8 MPa

P3=3.18 MPa to 2.97 MPa

Estimation of Gas-Liquid Equilibrium Physical Properties of DME/CO$_2$ Mixed System In the simulation study, the accuracy of the employed estimation model for physical properties is an important factor and a trial examination was performed as follows.

In general, a gas-liquid equilibrium relation is expressed in the following equation.

$$\phi_i P y_i = f_i^{(0)} \gamma_i^{(0)} x_i \times \exp \int_0^P \overline{V}_i^L / RT_{dp}$$

$\phi_i$: Gas phase Fugacity Coeff.
P: System Pressure
$y_i$: Gas phase mol fraction
$f_i^{(0)}$: Liquid phase standard Fugacity
$\gamma_i^{(0)}$: Activity coefficient of liquid phase
$x_i$: Liquid phase mol fraction $$\exp \int_0^P \overline{V}_i^L / RT_{dp}$$

: Poynting Factor

Points to be considered are following three points.

(1) $\gamma_i^{(0)}$ model for DME
(2) Degree of relative volatility of DME and CO$_2$
(3) Enthalpy and entropy model Although DME is an oxygen containing low molecular weight compound, since the boiling point of the representative substance, ethanol, is 78° C., whereas that of DME is −25° C., it can be understood that it has no strong polarity as compared with alcohol, aldehyde and ketone groups. Consequently, a regular dissolution model can be applied for $\gamma_i^{(0)}$ of DME.

As obtained from DME/CO$_2$ solubility test data (Table 1), values of K-volume of DME and CO$_2$ are within the range of 0.66<KDME<0.80 and 2.59<KCO$_2$<3.42, respectively, indicating that there is no large difference in volatility between DME and CO$_2$. Consequently, a vapor pressure model can be applied for $f_i^{(0)}$.

Since the estimated maximum pressure for use in DME+CO$_2$ system with regard to enthalpy and entropy is approximately 10 MPa, SRK (Soave-Redlich-Kwong) equation of state can suitably be employed.

$$P = \frac{RT}{v-b} - \frac{a[1 + (0.48 + 1.574w - 0.176w^2)(1 - Tr)^{1/2}]^2}{v^2 + bv}$$

$\gamma_i^{(0)}$: Regular Solution Model
$f_i^{(0)}$: Vapor Pressure Model
$\phi_i$, H, S: SRK equation of State
Poynting Factor: Considered When pressure of the system become high in some degree (several MPa), Poynting factor cannot be negligible, consequently this point was also taken into consideration.

Program

The following two programs, A and B were used.

(1) DME CO$_2$ A

Flash calculation under given composition, T (temperature) and P (pressure).

A bubble point was calculated under the given composition and P1 (the output pressure of the compressor).

According to this condition, confirmation for an accuracy of gas-liquid equilibrium physical property estimation model and whether total condensation in the condenser can be in sight.

(2) DME CO$_2$B

Using the above explained simulator, COP of carbon dioxide alone and the refrigerant containing dimethyl ether and carbon dioxide were obtained as follows.

Simulation of hot water supply ability of a dimethyl ether/carbon dioxide mixed refrigerant In order to evaluate hot water supply ability of a dimethyl ether/carbon dioxide mixed refrigerant, simulation was performed by using the discharge pressure of the compressor, the discharge temperature, the pressure of the vaporizer and the mixing ratio of DME/CO$_2$ as fluctuating parameter for calculation under the above described conditions. Hereinbelow, simulation results of a refrigerant property in each DME/CO$_2$ mixing ratio (mol %) are shown. In the following table, "inlet/outlet" of the evaporation temperatures of a refrigerant indicate temperatures of the refrigerant in the inlet and the outlet of the vaporizer.

Herein, Tables 2-1 to 2-5 show simulation results at a discharge temperature of 130° C., tables 3-1 to 3-5 show simulation results at a discharge temperature of 120° C., and Tables 4-1 to 4-5 show simulation results at a discharge temperature of 100° C.

TABLE 2-1

CO$_2$ refrigerant alone (discharge temperature: 130° C.)

| Discharge pressure (MPa) | Discharge temperature (° C.) | Total heat absorption amount in vaporizer (KCAL/H) | Amount of power of compressor (KCAL/H) | Vaporization pressure (MPa) | Vaporization temperature (° C.) inlet/outlet | COP |
|---|---|---|---|---|---|---|
| 10 | 130.2 | 224290 | 104310 | 3.08 | −0.1/−0.1 | 3.15 |
| 10 | 129.8 | 224240 | 103910 | 3.09 | 0.0/0.0 | 3.16 |

TABLE 2-2

DME/CO$_2$ = 3/97 (mol %) (discharge temperature: 130° C.)

| Discharge pressure (MPa) | Discharge temperature (° C.) | Total heat absorption amount in vaporizer (KCAL/H) | Amount of power of compressor (KCAL/H) | Vaporization pressure (MPa) | Vaporization temperature (° C.) inlet/outlet | COP |
|---|---|---|---|---|---|---|
| 9.10 | 129.3 | 223580 | 105470 | 2.8 | −6.5/0.2 | 3.21 |
| 9.13 | 129.7 | 233650 | 105840 | 2.8 | −6.5/0.2 | 3.21 |
| 9.16 | 130.0 | 233710 | 106190 | 2.8 | −6.5/0.2 | 3.20 |

TABLE 2-3

DME/CO$_2$ = 4/96 (mol %) (discharge temperature: 130° C.)

| Discharge pressure (MPa) | Discharge temperature (° C.) | Total heat absorption amount in vaporizer (KCAL/H) | Amount of power of compressor (KCAL/H) | Vaporization pressure (MPa) | Vaporization temperature (° C.) inlet/outlet | COP |
|---|---|---|---|---|---|---|
| 9.00 | 132.0 | 238520 | 107490 | 2.75 | −6.6/2.1 | 3.22 |
| 9.00 | 130.3 | 238330 | 105320 | 2.80 | −6.0/2.6 | 3.26 |
| 9.00 | 128.7 | 238130 | 103200 | 2.85 | −5.3/3.2 | 3.31 |
| 9.00 | 127.2 | 237920 | 101280 | 2.90 | −4.7/3.8 | 3.35 |

TABLE 2-4

DME/CO$_2$ = 5/95 (mol %) (discharge temperature: 130° C.)

| Discharge pressure (MPa) | Discharge temperature (° C.) | Total heat absorption amount in vaporizer (KCAL/H) | Amount of power of compressor (KCAL/H) | Vaporization pressure (MPa) | Vaporization temperature (° C.) inlet/outlet | COP |
|---|---|---|---|---|---|---|
| 8.48 | 130.3 | 242550 | 106150 | 2.65 | −7.4/3.1 | 3.28 |
| 8.46 | 130.0 | 242500 | 105880 | 2.65 | −7.4/3.1 | 3.29 |
| 8.44 | 129.7 | 242460 | 105610 | 2.65 | −7.4/3.1 | 3.30 |

TABLE 2-5

DME/CO$_2$ = 6/94 (mol %) (discharge temperature: 130° C.)

| Discharge pressure (MPa) | Discharge temperature (° C.) | Total heat absorption amount in vaporizer (KCAL/H) | Amount of power of compressor (KCAL/H) | Vaporization pressure (MPa) | Vaporization temperature (° C.) inlet/outlet | COP |
|---|---|---|---|---|---|---|
| 8.05 | 129.4 | 246560 | 105690 | 2.55 | −8.2/4.1 | 3.33 |
| 8.07 | 129.7 | 246600 | 105970 | 2.55 | −8.2/4.1 | 3.33 |
| 8.10 | 130.2 | 246660 | 106400 | 2.55 | −8.2/4.1 | 3.32 |
| 8.06 | 129.6 | 246580 | 105830 | 2.55 | −8.2/4.1 | 3.33 |

TABLE 3-1

CO$_2$ refrigerant alone (discharge temperature: 120° C.)

| Discharge pressure (MPa) | Discharge temperature (° C.) | Total heat absorption amount in vaporizer (KCAL/H) | Amount of power of compressor (KCAL/H) | Vaporization pressure (MPa) | Vaporization temperature (° C.) inlet/outlet | COP |
|---|---|---|---|---|---|---|
| 9.00 | 119.9 | 222310 | 96214 | 2.99 | −1.0/−1.0 | 3.31 |
| 9.00 | 120.2 | 222360 | 96609 | 2.98 | −1.2/−1.2 | 3.30 |
| 9.00 | 120.5 | 222410 | 97006 | 2.97 | −1.3/−1.3 | 3.29 |

TABLE 3-2

DME/CO$_2$ = 3/97 (mol %) (discharge temperature: 120° C.)

| Discharge pressure (MPa) | Discharge temperature (° C.) | Total heat absorption amount in vaporizer (KCAL/H) | Amount of power of compressor (KCAL/H) | Vaporization pressure (MPa) | Vaporization temperature (° C.) inlet/outlet | COP |
|---|---|---|---|---|---|---|
| 8.45 | 120.2 | 232090 | 97315 | 2.80 | −6.5/0.2 | 3.38 |
| 8.43 | 119.9 | 232040 | 97053 | 2.80 | −6.5/0.2 | 3.39 |
| 8.40 | 119.5 | 231960 | 96660 | 2.80 | −6.5/0.2 | 3.40 |

TABLE 3-3

DME/CO$_2$ = 4/96 (mol %) (discharge temperature: 120° C.)

| Discharge pressure (MPa) | Discharge temperature (° C.) | Total heat absorption amount in vaporizer (KCAL/H) | Amount of power of compressor (KCAL/H) | Vaporization pressure (MPa) | Vaporization temperature (° C.) inlet/outlet | COP |
|---|---|---|---|---|---|---|
| 8.00 | 120.0 | 236490 | 97437 | 2.68 | −7.5/1.2 | 3.43 |
| 8.00 | 120.3 | 236530 | 97872 | 2.67 | −7.6/1.1 | 3.42 |
| 8.00 | 119.7 | 236460 | 97003 | 2.69 | −7.4/1.3 | 3.44 |
| 8.00 | 120.7 | 236560 | 98311 | 2.66 | −7.8/1.0 | 3.41 |

TABLE 3-4

DME/CO$_2$ = 5/95 (mol %) (discharge temperature: 120° C.)

| Discharge pressure (MPa) | Discharge temperature (° C.) | Total heat absorption amount in vaporizer (KCAL/H) | Amount of power of compressor (KCAL/H) | Vaporization pressure (MPa) | Vaporization temperature (° C.) inlet/outlet | COP |
|---|---|---|---|---|---|---|
| 7.75 | 119.4 | 240870 | 96156 | 2.65 | −7.4/3.1 | 3.51 |
| 7.80 | 120.2 | 241000 | 96869 | 2.65 | −7.4/3.1 | 3.49 |
| 7.85 | 121.0 | 241120 | 97579 | 2.65 | −7.4/3.1 | 3.47 |

TABLE 3-5

DME/CO$_2$ = 6/94 (mol %) (discharge temperature: 120° C.)

| Discharge pressure (MPa) | Discharge temperature (° C.) | Total heat absorption amount in vaporizer (KCAL/H) | Amount of power of compressor (KCAL/H) | Vaporization pressure (MPa) | Vaporization temperature (° C.) inlet/outlet | COP |
|---|---|---|---|---|---|---|
| 7.47 | 120.4 | 245220 | 97361 | 2.55 | −8.2/4.1 | 3.52 |
| 7.47 | 120.4 | 245210 | 97287 | 2.55 | −8.2/4.1 | 3.52 |
| 7.46 | 120.3 | 245200 | 97212 | 2.55 | −8.2/4.1 | 3.52 |

TABLE 4-1

CO$_2$ refrigerant alone (discharge temperature: 100° C.)

| Discharge pressure (MPa) | Discharge temperature (° C.) | Total heat absorption amount in vaporizer (KCAL/H) | Amount of power of compressor (KCAL/H) | Vaporization pressure (MPa) | Vaporization temperature (° C.) inlet/outlet | COP |
|---|---|---|---|---|---|---|
| 8.00 | 99.8 | 218430 | 76756 | 3.18 | 1.0/1.0 | 3.85 |
| 8.00 | 100.3 | 218530 | 77446 | 3.16 | 0.8/0.8 | 3.82 |
| 8.00 | 100.9 | 218640 | 78143 | 3.14 | 0.6/0.6 | 3.80 |

TABLE 4-2

DME/CO$_2$ = 3/97 (mol %) (discharge temperature: 100° C.)

| Discharge pressure (MPa) | Discharge temperature (° C.) | Total heat absorption amount in vaporizer (KCAL/H) | Amount of power of compressor (KCAL/H) | Vaporization pressure (MPa) | Vaporization temperature (° C.) inlet/outlet | COP |
|---|---|---|---|---|---|---|
| 7.13 | 99.7 | 228450 | 79250 | 2.80 | −6.5/0.2 | 3.88 |
| 7.15 | 100.1 | 228510 | 79537 | 2.80 | −6.5/0.2 | 3.87 |

TABLE 4-3

DME/CO$_2$ = 4/96 (mol %) (discharge temperature: 100° C.)

| Discharge pressure (MPa) | Discharge temperature (° C.) | Total heat absorption amount in vaporizer (KCAL/H) | Amount of power of compressor (KCAL/H) | Vaporization pressure (MPa) | Vaporization temperature (° C.) inlet/outlet | COP |
|---|---|---|---|---|---|---|
| 7.00 | 100.0 | 233330 | 78249 | 2.80 | −5.9/2.6 | 3.98 |
| 7.00 | 98.5 | 233130 | 76333 | 2.85 | −5.3/3.2 | 4.05 |
| 7.00 | 97.6 | 233010 | 75205 | 2.88 | −4.9/3.6 | 4.10 |
| 7.00 | 97.0 | 232920 | 74462 | 2.90 | −4.7/3.8 | 4.13 |

TABLE 4-4

DME/CO$_2$ = 5/95 (mol %) (discharge temperature: 100° C.)

| Discharge pressure (MPa) | Discharge temperature (° C.) | Total heat absorption amount in vaporizer (KCAL/H) | Amount of power of compressor (KCAL/H) | Vaporization pressure (MPa) | Vaporization temperature (° C.) inlet/outlet | COP |
|---|---|---|---|---|---|---|
| 6.60 | 100.1 | 237740 | 78958 | 2.65 | −7.3/3.1 | 4.01 |
| 6.55 | 99.2 | 237590 | 78173 | 2.65 | −7.3/3.1 | 4.04 |

TABLE 4-4-continued

DME/CO$_2$ = 5/95 (mol %) (discharge temperature: 100° C.)

| Discharge pressure (MPa) | Discharge temperature (° C.) | Total heat absorption amount in vaporizer (KCAL/H) | Amount of power of compressor (KCAL/H) | Vaporization pressure (MPa) | Vaporization temperature (° C.) inlet/outlet | COP |
|---|---|---|---|---|---|---|
| 6.57 | 99.6 | 237650 | 78487 | 2.65 | −7.3/3.1 | 4.03 |
| 6.54 | 99.1 | 237560 | 78015 | 2.65 | −7.3/3.1 | 4.05 |

TABLE 4-5

DME/CO$_2$ = 6/94 (mol %) (discharge temperature: 100° C.)

| Discharge pressure (MPa) | Discharge temperature (° C.) | Total heat absorption amount in vaporizer (KCAL/H) | Amount of power of compressor (KCAL/H) | Vaporization pressure (MPa) | Vaporization temperature (° C.) inlet/outlet | COP |
|---|---|---|---|---|---|---|
| 6.34 | 100.8 | 242180 | 79676 | 2.55 | −8.1/4.1 | 4.04 |
| 6.33 | 100.6 | 242150 | 79512 | 2.55 | −8.1/4.1 | 4.05 |
| 6.31 | 100.2 | 242090 | 79183 | 2.55 | −8.1/4.1 | 4.06 |

As obvious from Tables 2-1 to 4-5, when the same discharge temperature is intended to be obtained, as a mixing amount of DME is larger, a discharge pressure decreases, and a distance between a condensation point and a boiling point in a two-layered region which corresponds to a vaporization process in the Mollier diagram becomes wider, and COP becomes high. That is, as compared with a carbon dioxide refrigerant alone, a higher discharge temperature is obtained at a lower discharge pressure, which results in a higher total amount of exhaust heat can be obtained in a condenser.

From the above result, in the system operating at the condenser discharge temperature at 15° C. or less, the refrigerant composition of the present invention can be expected for utilization in the refrigerant for domestic hot water supply/heating system, the refrigerant for industrial air conditioning (heat pump) and refrigerating machine, and the refrigerant for heat pump utilizing geothermal heat to an alleviate heat-island phenomenon.

The invention claimed is:

1. A method of using a refrigerant composition for a hot water supply/heating system, the method comprising utilizing a composition that comprises 1 to 10% by mole of dimethyl ether and 99 to 90% by mole of carbon dioxide on the basis of the total number of moles of dimethyl ether and carbon dioxide as a refrigerant in the hot water supply/heating system.

2. A method of using a refrigerant composition for a hot water supply/heating system, the method comprising utilizing a composition that comprises 3 to 8% by mole of dimethyl ether and 97 to 92% by mole of carbon dioxide on the basis of the total number of moles of dimethyl ether and carbon dioxide as a refrigerant in the hot water supply/heating system.

* * * * *